July 6, 1926.

C. E. BROWN

AUTOMOBILE SIGNAL

Filed May 16, 1921

1,591,464

Inventor,
C. E. Brown

By C. A. Snow & Co.
Attorneys.

Patented July 6, 1926.

1,591,464

UNITED STATES PATENT OFFICE.

CARL E. BROWN, OF COLUMBUS, OHIO.

AUTOMOBILE SIGNAL.

Application filed May 16, 1921. Serial No. 469,893.

The device forming the subject matter of this application is a signal, adapted to be mounted on a motor propelled vehicle, for the purpose of warning pedestrians and the drivers of other vehicles.

The invention aims to provide novel means whereby the signal member or disk will be held in adjusted positions.

In the accompanying drawings:—

Figure 1:
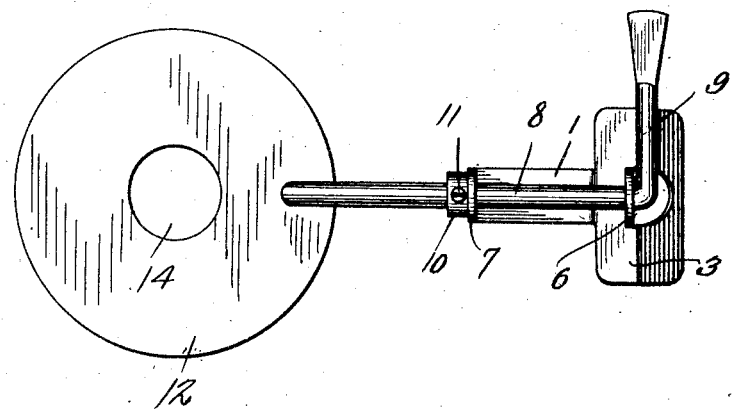
Figure 2:
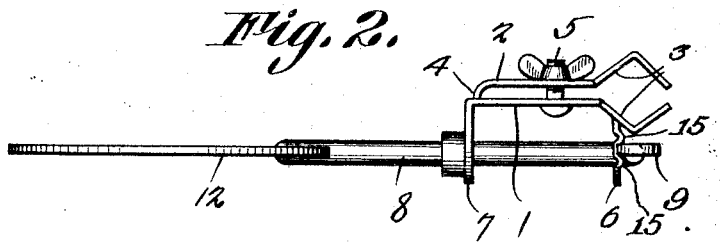

Figure 1 shows in elevation, a device constructed in accordance with the invention; Figure 2 is a top plan.

In carrying out the invention there is provided a support including a main member 1 and an auxiliary member 2, the members 1 and 2 being provided with cooperating jaws 3 adapted to engage a portion of a windshield of a car, or the like. The auxiliary member 2 has an angularly disposed end 4 bearing on the main member 1. The members 1 and 2 are connected by a tightening device 5, which may be a bolt or wing nut. A bearing 6 is struck from the jaw 3 of the main member 1. At its inner end, the main member 1 is bent to form a bearing 7.

A shaft 8 is mounted for rocking movement in the bearings 6 and 7 and is provided at its inner end with a handle 9. The shaft 8 carries a collar 10 held in place by a set screw 11. The collar 10 cooperates with the bearing 7 to prevent the shaft from sliding endwise in one direction, the handle 9 cooperating with the bearing 6 to prevent the shaft from sliding endwise in an opposite direction. A signal member in the form of a disk is carried by the outer end of the shaft 8. At the geometrical center of the disk 12, the disk is provided with an opening 14.

The bearing 6 is provided with projections 15 which, cooperating with the handle 9, hold the shaft 8 positively against rotation and the collar 10 holds the shaft in such position that the handle 9 will cooperate with the projections 15.

I claim:—

In a device of the class described, a main member provided with transversely spaced outstanding bearings, one bearing being supplied on its outer surface with projections, a shaft journaled in the bearings, a signal on one end of the shaft, a handle on the opposite end of the shaft, a collar adjustable along the shaft and cooperating with the outer surface of the other bearing to hold the handle close enough to the outer surface of the first-specified bearing so that the projections will receive the handle, when the handle is swung, thereby holding the handle and the signal in the position to which they have been swung, and releasable means carried by the collar and cooperating with the shaft for holding the collar in adjusted positions along the shaft.

In testimony that I claim the foregoing as my own, I have hereto affixed my signature.

CARL E. BROWN.